United States Patent [19]

Shinomura et al.

[11] Patent Number: 5,360,007
[45] Date of Patent: Nov. 1, 1994

[54] ULTRASONIC APPARATUS

[75] Inventors: Ryuuichi Shinomura, Higashimatsuyama; Kageyoshi Katakura, Tokyo, both of Japan

[73] Assignee: Hitachi, Ltd., Tokyo, Japan

[21] Appl. No.: 105,906

[22] Filed: Jul. 19, 1993

Related U.S. Application Data

[63] Continuation of Ser. No. 858,083, Mar. 26, 1992, abandoned.

[30] Foreign Application Priority Data

Mar. 24, 1991 [JP] Japan ................................. 3-118975
Mar. 26, 1991 [JP] Japan ................................. 3-061472

[51] Int. Cl.$^5$ ............................................. A61B 8/12
[52] U.S. Cl. ............................ 128/661.01; 128/662.06
[58] Field of Search ................ 128/660.01, 660.05, 128/660.07, 661.01, 662.03, 662.06, 663.01; 310/800

[56] References Cited

U.S. PATENT DOCUMENTS

| | | | |
|---|---|---|---|
| 3,815,409 | 6/1974 | Macovski | 73/67.9 |
| 4,747,411 | 5/1988 | Ledley | 128/660 |
| 5,070,879 | 12/1991 | Herres | 128/662.06 |
| 5,109,861 | 5/1992 | Walinsky et al. | 128/662.06 |
| 5,115,809 | 5/1992 | Saitoh et al. | 128/662.03 |

FOREIGN PATENT DOCUMENTS

| | | | |
|---|---|---|---|
| 2435666 | 6/1977 | Germany | 128/661.01 |
| 2949991 | 10/1983 | Germany | 128/660.01 |
| 8910368.8 | 12/1989 | Germany | 128/662.06 |

OTHER PUBLICATIONS

K. Katakura, "Underwater Acoustic Imaging By Frequency Controlled Beam Scanning," 1975, pp. 716-724.

*Primary Examiner*—William E. Kamm
*Assistant Examiner*—George Manuel
*Attorney, Agent, or Firm*—Antonelli, Terry, Stout & Kraus

[57] ABSTRACT

An ultrasonic apparatus for transmitting ultrasonic waves and receiving reflection waves from an examination subject for display is used in a blood vessel with a catheter for two-dimensional imaging and three-dimensional scanning for three-dimensional imaging. The ultrasonic apparatus includes a transducer, installed within a catheter, which transmits ultrasonic waves in a direction corresponding to a transducer drive signal frequency and receives reflection waves from an examination subject, to display a tomogram image obtained by the transducer. Also, the ultrasonic apparatus includes an ultrasonic probe having arrayed transducers in an elongated shape which transmit ultrasonic waves in a direction corresponding to a transducer drive signal frequency and receive reflection waves from an examination subject, and a device for electronic scanning and focusing in a direction of array of the transducers in the elongated shape, and electronic scanning in a direction perpendicular to that direction is conducted by changing the transducer drive signal frequency.

22 Claims, 10 Drawing Sheets

ULTRASONIC APPARATUS

This application is a continuation of application Ser. No. 07/858,083, filed Mar. 26, 1992 now abandoned.

BACKGROUND OF THE INVENTION

The present invention relates to an ultrasonic apparatus for transmitting ultrasonic waves to an examination subject and receiving reflection waves from an examination subject for display and, more particularly, to the diagnosis and operation of a blood vessel with a catheter in a two-dimensional aspect of an imaging technique, and to an imaging method and probes which enable three-dimensional scanning for three-dimensional imaging or the like in a three-dimensional aspect of the imaging technique.

In a conventional two-dimensional imaging techniques, an intravascular ultrasound imaging system or a blood flow measuring apparatus of Doppler effect, can be used as an ultrasonic apparatus in which ultrasonic transducers are attached to a catheter. In most kinds of such intravascular ultrasound imaging system, transducers or ultrasonic reflectors are rotated to obtain a two-dimensional tomogram image. In some apparatus, transducers are arranged on the periphery of a catheter. A laser is inserted in a catheter for treatment of a thrombus adhered to the inner wall of a blood vessel, for example, an atheroma. For the blood flow measuring apparatus, a single plate is mounted on the catheter.

In order to scan a beam in three dimensions, there has conventionally been a structure in which two-dimensional array probes juxtaposed in directions X and Y are used, a signal line is led from each element, and delay lines are provided on almost all the transducers to form a beam either in the direction X or in the direction Y, as disclosed in Japanese Patent Unexamined Publication No. 62-4988. As a representative two-dimensional array probe, there is a probe of divided PZT, as disclosed in, for example, "Fundamental Experiment on Matrix-Array Transducer" in a collection of lecture theses of Japanese Journal of Medical Ultrasonics Supplement II (Proceeding of the 47th Meeting, November, 1985). This is a probe divided in two dimensions by grooves in matrix forms.

The inventors of the present application previously suggested a transmitter which transmits ultrasonic waves in a direction corresponding to a drive frequency in order to simplify the phasing unit, as disclosed in "High-Speed Ultrasonic Imaging System" in a collection of lecture theses of Japanese Journal of Medical Ultrasonic Supplement II (proceeding of the 36th Meeting, November, 1971).

In this transmitter, as shown in FIG. 23A, polarization-inverted array transducers are driven by frequency sweepage so as to radiate ultrasonic waves in a direction corresponding to the frequency signal. FIG. 23B illustrates a relation between an angle $\theta$ of radiation of ultrasonic waves and a drive signal frequency f. In FIG. 23C, the numerals 1, 2, 3, ... n denote transducer elements formed in such a matter that the axial directions of the polarization thereof are alternately different from each other.

When driving the transducer elements by a drive frequency $f_1$, the sonic phases of the adjacent transducer elements such as 1 and 2 are inverted relative to one another. Thus, the phase of the sonic wave (indicated by a solid line) from the transducer element 1 and the phase of the sonic wave (indicated by a broken line) from the transducer element 2 are inverted. Therefore, wave surfaces comprising sonic waves from n transducer elements are formed in a direction of $\theta$ to a normal direction to the transducer element surface.

When driving the transducer elements by a drive frequency $f_2$ smaller than the drive frequency $f_1$, the wave surfaces are formed in a different direction from the direction of $\theta$.

Accordingly, the ultrasonic waves can be transmitted in respective directions determined by the plural drive frequencies. When a polarization inversion pitch of the transducers is expressed by d, the drive signal frequency is expressed by f, and its wavelength is expressed by $\lambda$, the radiation angle $\theta$ can be obtained from the following equation:

$$\theta = \sin^{-1}(\lambda/2d)$$

Further, a far field directivity $R(\theta)$ at the time can be obtained from the following equation:

$$R(\theta) = \sin\{n(\zeta-\gamma)/2\}/\sin\{(\zeta-\gamma)/2\}$$

$$\gamma = (2\pi \, d/\lambda)\sin\theta$$

wherein
  n denotes number of elements in the array
  $\zeta = \pi$: a phase difference between sound waves radiated from adjacent elements This relation is utilized to scan the beam.

The above-mentioned catheter in the conventional technique requires a rotational shaft for rotating the transducers or ultrasonic reflectors to obtain two-dimensional tomogram images. However, torsion of this shaft and non-uniformity in the rotations degrade the quality of images, and further, there are safety problems. Moreover, in the catheter for laser operation, an optical fiber is employed for monitoring the inside of a blood vessel, and consequently, it is necessary to displace the blood with physiological saline. The catheter with arrayed transducers has a problem that the diameter of the catheter is increased because signal lines connected to the respective transducers are extended within the catheter. In relation to the transmitter shown in FIGS. 23A, 23B and 23C suggested by the inventors of the present application, only the basic matters in the C-mode imaging are described, and no explanation has been given to tomography and application to catheters.

Furthermore, in the conventional technique, when two-dimensional arrays are used for scanning the beam in three dimensions, for example, a number $n \times n$ of signal lines are necessary in the case of $n \times n$ matrix, and in accordance with an increase in the number of the signal lines, the number of the phasing units are increased. Therefore, there is a problem that the scale of the apparatus is increased in actual construction. In the conventional technique shown in FIG. 23A, two-dimensional arrangement of the transmitter, which transmits ultrasonic waves in a direction corresponding to a drive signal frequency, has not been explained, and no method of three-dimensional beam scanning has been mentioned.

SUMMARY OF THE INVENTION

Taking into account the small number of signal lines, which is theoretically one, in an imaging and operation system with a catheter in particular, it is an object of the present invention to drive a transducer of ultrasonic waves which is attached to the distal end of the catheter and to scan a beam of ultrasonic waves electrically, to thereby enable the thin catheter to pick up images within a blood vessel.

Another object of the invention is to solve the above-described problems by providing an ultrasonic apparatus in which probes are arranged to scan beams of ultrasonic waves in three dimensions without using two-dimensional arrangement probes, so that the number of signal lines of the probes can be lessened, and that a phasing unit for beam forming of transmission and reception can be simplified. Further, it is also an object to provide a method of ultrasonic diagnosis in which three-dimensional imaging can be conducted and three-dimensional images can be easily obtained.

These objects can be attained by providing, in a catheter, a transducer which transmits ultrasonic waves in a direction corresponding to a drive signal frequency.

With this structure, when using the transducer, such as a polarization-inverted array, which transmits ultrasonic waves in a direction corresponding to a drive signal frequency, sector scanning of ultrasonic beams can be performed by frequency sweepage with one signal line, and consequently, imaging within a blood vessel can be electrically realized with the thin catheter.

Moreover, in order to attain the above-mentioned objects, the ultrasonic apparatus of the invention is characterized in that it comprises an ultrasonic probe constituted of arrayed transducers in an elongated shape which transmit ultrasonic waves in a direction corresponding to a drive signal frequency and receive reflection waves from an examination subject, and means for electronic scanning and focusing in a direction of array of the transducers in the elongated shape (transmission pulse generators, transmission and reception delay circuits and so forth), so that electronic scanning in a direction perpendicular to that direction is conducted by changing the center frequency.

The ultrasonic probe is characterized in that it comprises means for acoustic matching with the examination subject which are provided on the front surface of the transducers (an acoustic matching layer), means for supporting the transducers from behind (a backing material), and means for absorbing ultrasonic waves in directions except the intended direction (an ultrasonic wave absorber), and that the surfaces of the transducers are inclined in the direction perpendicular to the direction of arrayal of the transducers in the elongated shape with respect to the radiation plane of ultrasonic waves, the transducers comprising equally spaced polarization-inverted array transducers.

The ultrasonic diagnosis method of the invention is characterized in that images of the examination subject are picked up from two directions by the above-described ultrasonic probes for three-dimensional scanning with ultrasonic beams, and that views of normal vision obtained by the probes are shown on display corresponding to these two directions.

Furthermore, the three-dimensional imaging apparatus of the invention is characterized in that it comprises the above-described probes, and that three-dimensional data obtained in the above method are subjected to software processing to thereby perform picture element display and shadow display.

With the above-described structure according to the invention, the ultrasonic apparatus comprises the ultrasonic probes each of which is constructed with an array of transducers in the elongated shape which transmit ultrasonic waves in a direction corresponding to a drive signal frequency and receive the reflection waves, and the phasing means for sector scanning and focusing in the direction of array of the transducers in the elongated shape. Sector scanning in the direction perpendicular to that direction is conducted by changing the center frequency, and sweepage of frequencies into the vicinity of the center frequency is also performed.

As a result, the number of delay lines can be made smaller than in the conventional technique. Moreover, mixing of drive signals having phase information enables formation of the same beam as the transmission. Furthermore, when displaying views of normal vision from two directions, a three-dimensional image can be easily obtained due to the parallax.

DETAILED DESCRIPTION OF THE INVENTION

Embodiments of the present invention will be hereinafter described with reference to the attached drawings.

Figure 1A:
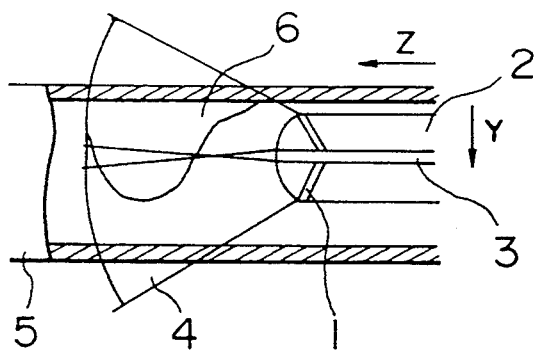
FIGS. 1A and 1B are diagrams showing a first embodiment of the present invention.
Figure 1B:
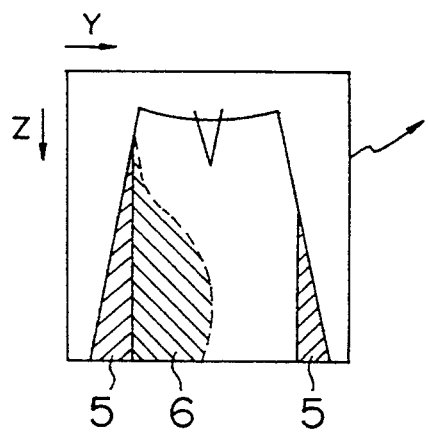

A first embodiment is shown in FIG. 1. A catheter 2 is provided with transducers 1 for transmitting ultrasonic waves in a direction corresponding to a drive frequency and an optical fiber 3 for a laser beam. This catheter 2 is inserted into a blood vessel 5. Ultrasonic waves 4 are transmitted/scanned from the transducers 1. A B-mode tomogram image of the blood vessel 5 is shown on a display or illustrated in FIG. 1B, and a thrombus 6, e.g., an atheroma is also indicated. This thrombus 6 is crushed and vaporized by the laser beam.

Figure 2A:
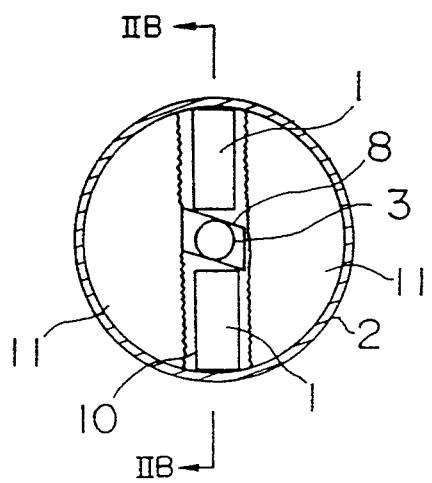
FIGS. 2A and 2B are sectional views partially showing the embodiment of FIG. 1 in detail.
Figure 2B:
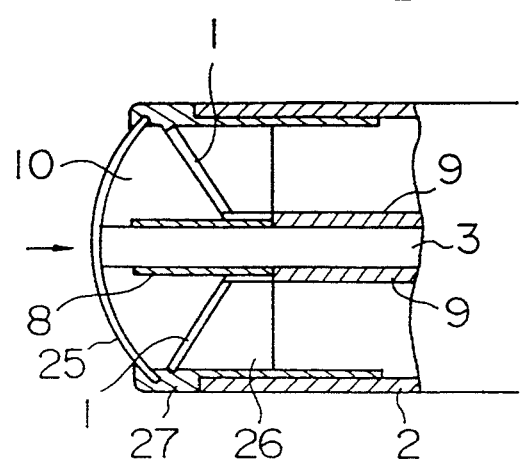

FIGS. 2A and 2B illustrate in detail the particular embodiment of FIG. 1 having the catheter 2 with the transducers 1 for transmitting ultrasonic waves in a direction corresponding to a drive signal frequency. FIG. 2A is a front view of the embodiment, as viewed in a direction indicated by an arrow in FIG. 2B, and FIG. 2B is a sectional view of the same, taken along the B—B line in FIG. 2A. Referring to FIG. 2B, the fiber 3 for laser operation is disposed in the center, and the transducers 1 are provided on both sides of the fiber 3 and inclined to define a V shape with the fiber 3. Transducer support members 26 serve to fix each of the transducers 1 securely on the catheter 2 and the fiber 3. A lens 25 is provided in front of transducers 1 to concentrate beams of ultrasonic waves from the transducers 1 in a direction perpendicular to the direction of scanning the beams or in a direction of the minor axis. Holder 27 serves to connect this head portion to the catheter 2. Absorber 8 absorbs ultrasonic waves in the $-\theta$ direction which are radiated from the transducers 1, and also, they are inclined at an angle to prevent reflection waves from returning to the transducers 1. Since two transducers are provided in this embodiment, two signal lines 9 are necessary. Of course, ground lines are also necessary. Acoustic coupling fluid 10 is provided between the lens 25 and the transducers 1. Referring to FIG. 2A, the absorbers 8 are inclined with respect to the transducers 1. Ultrasonic wave absorbers 11 are inserted to the places perpendicular to the ultrasonic wave transmitting plane so as to allow ultrasonic waves to enter only through the front of the catheter 2 and thereby shield against the undesired ultrasonic waves which may enter from directions other than the predetermined direction.

Figure 3:
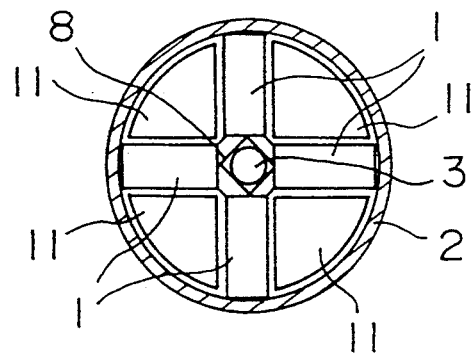
FIG. 3 is a sectional view showing a modification of the embodiment of FIG. 2.

FIG. 3 illustrates a modification of the first embodiment. The transducers 1 are provided in such a manner as to have a cross shape when viewed from the front while they are inclined to define V shapes with the fiber substantially in the same manner as the first embodiment.

Figure 4A:
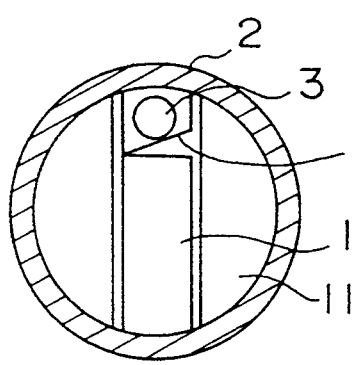
FIGS. 4A and 4B are sectional views partially showing a second embodiment provided in a catheter.
Figure 4B:
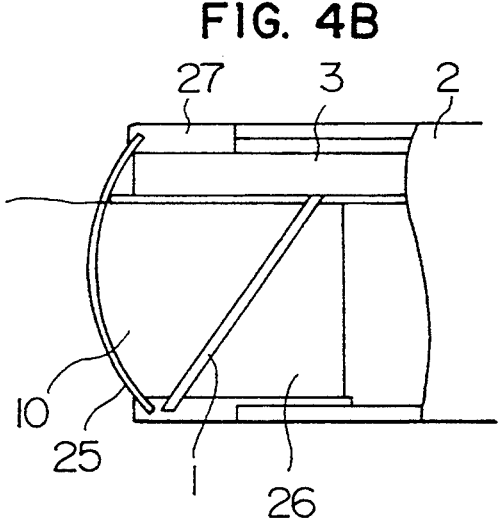

FIGS. 4A and 4B illustrate a second embodiment in which the fiber 3 is located on a peripheral side of the catheter 2 and only one transducer 1 is provided.

In either case, the ultrasonic wave absorbers 11 are provided beside the transducer(s) 1. However, semiconductor pressure sensors or blood flow velocity measuring transducers of Doppler effect may be provided instead. The transducers 1 may be inclined to define a V shape which is turned upside down to that in FIG. 2B, so that ultrasonic waves are transmitted to and received from the front at a low frequency so as to increase the depth of a field of the front view, and that ultrasonic waves are transmitted to and received from side walls of the blood vessel at a high frequency, thereby improving the resolution of the scanned part.

When a distal portion of the catheter 2 or the tip of the fiber 3 is arranged to be movable, it is easier to aim at a target with the laser beam.

Figure 5:
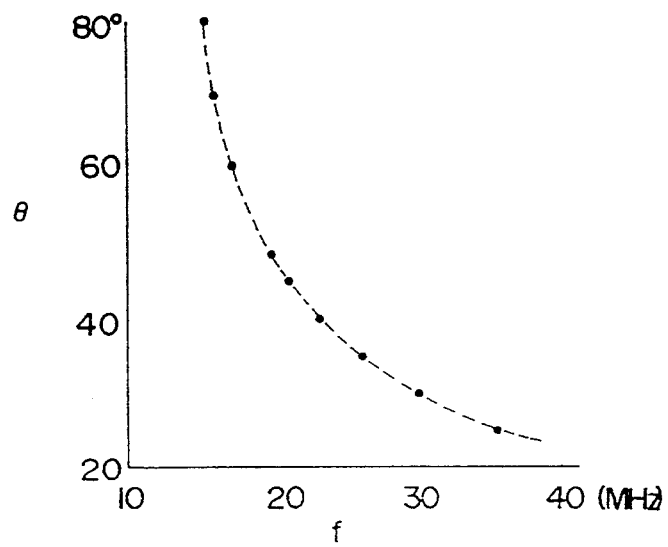
FIG. 5 is a graph showing one example of a relation of a radiation angle with respect to a drive frequency.
Figure 6:
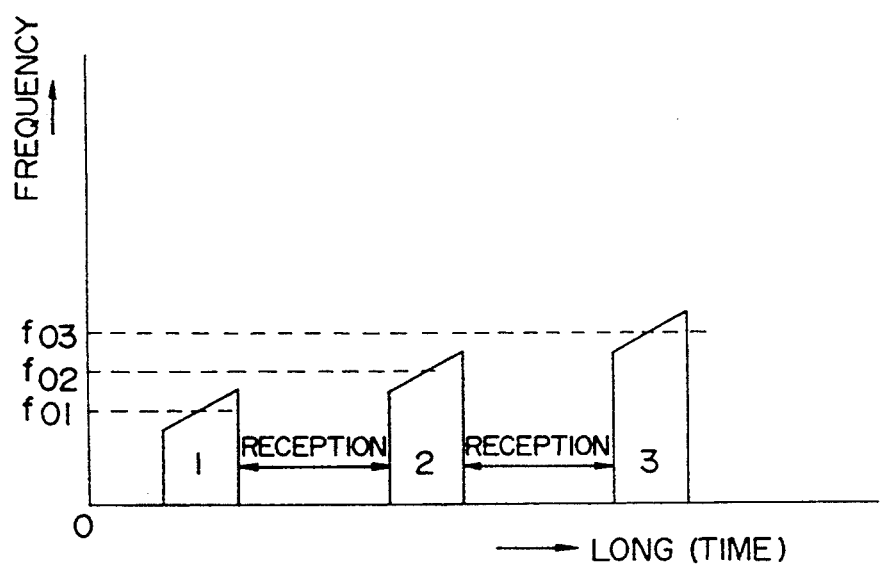
FIG. 6 is a diagram showing one example of a transmission/reception sequence.

FIG. 5 illustrates a relation between the transducer drive signal frequency and the radiation angle. This example is obtained in the case of a pitch d=0.05 mm and a number of transducers n=10. FIG. 6 shows a transmission sequence. The abscissa indicates time, and the ordinate indicates a transmission frequency. First, n/2 waves are transmitted at a center frequency $f_{01}$. After time not less than the time required for a round trip to the target maximum depth has elapsed, a second transmission is conducted. The second waves are transmitted at a center frequency $f_{02}$ so that the radiation angle can be changed. Time between these transmissions is a period of reception time.

Figure 7:
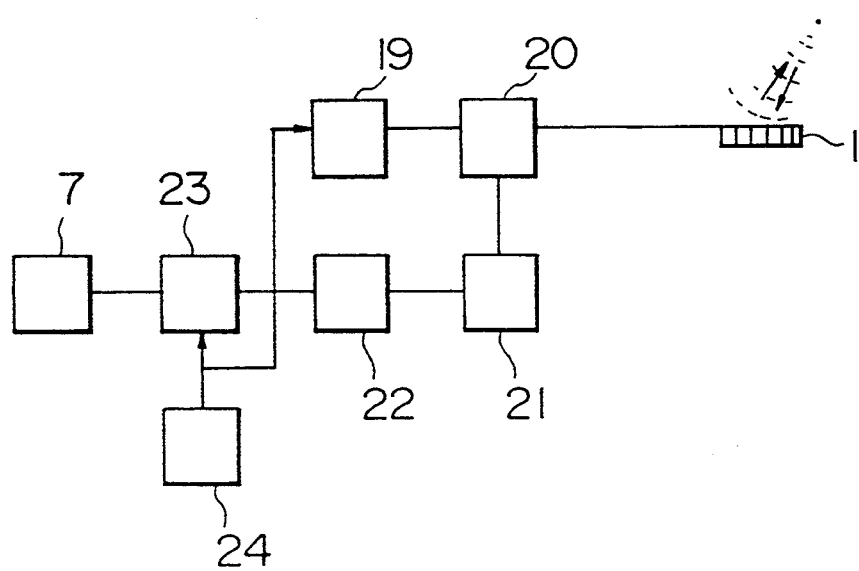
FIG. 7 is a block diagram of a basic system.

FIG. 7 is a block diagram of a basic system. A signal from a drive circuit 19 is passed through a transmission and reception separating circuit 20 in accordance with the above-described sequence, thereby driving the transducer 1. By way of the transmission and reception separating circuit 20, a reception signal is led into an amplifier 21 for amplification, and then, it is processed in a signal processing section 22, interpolated with 8 in a DSC (digital scan converter) 23, and shown on the display 7. A basic clock 24 provides clocking signals to DSC 23 and drive circuit 19.

Figure 8:
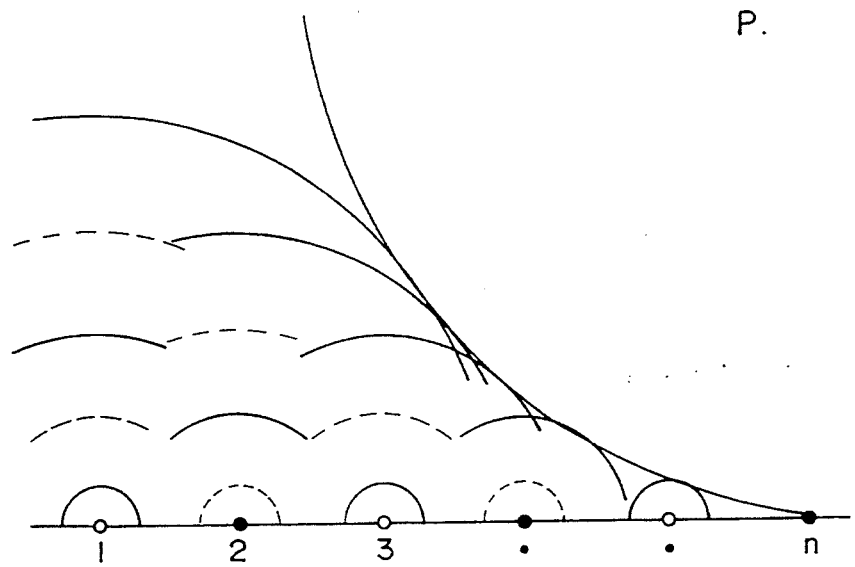
FIG. 8 is a diagram schematically illustrating electronic focusing.

FIG. 8 schematically shows electronic transmission focusing operation. Circles and filled dots indicate sound sources, and polarizations of the circles are opposite to those of the filled dots. In the case of n/2 wave transmission, when sweepage is performed from a lower frequency to a higher frequency with respect to a center frequency $f_{01}$ corresponding to a radiation angle, the wave surfaces form a concave surface, which focuses on a point P, as shown in FIG. 8. In the sequence shown in FIG. 6, the focus is illustrated by the drive frequency of transmission being swept from a lower frequency to a higher frequency with respect to the center frequency $f_{01}$. The focal distance is changed due to the rate of this inclination.

Figure 9:
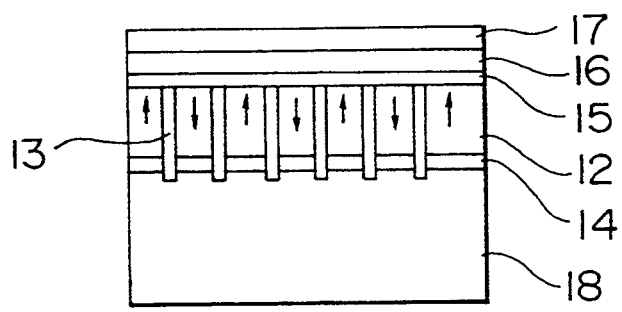
FIG. 9 is a diagram showing one embodiment of a transducer according to the invention.

FIG. 9 illustrates one example of a structure of the transducer 1 according to the invention. Transducers 12 are arranged to have alternately reverse directions of the polarizations, and filling members 13 are provided between the transducers 12 so as to prevent their lateral coupling. Electrodes 14, 15 are provided, and acoustic matching layers 16, 17 are formed on the ultrasonic wave transmission surface. An acoustic damping material is provided on the opposite side. The matching layers 16, 17 should preferably have a ¼ wavelength of the maximum center frequency. However, they may be thinner because transmission and reception are basically performed obliquely. Alternatively, they may have the center frequency in a direction regarded as important. Therefore, the thickness of the matching layers varies according to the purposes. Besides, the number of the matching layers is not limited to two.

Figure 10:
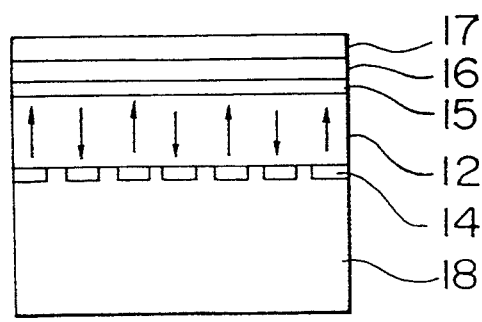
FIG. 10 is a diagram showing another embodiment of a transducer.
Figure 11:
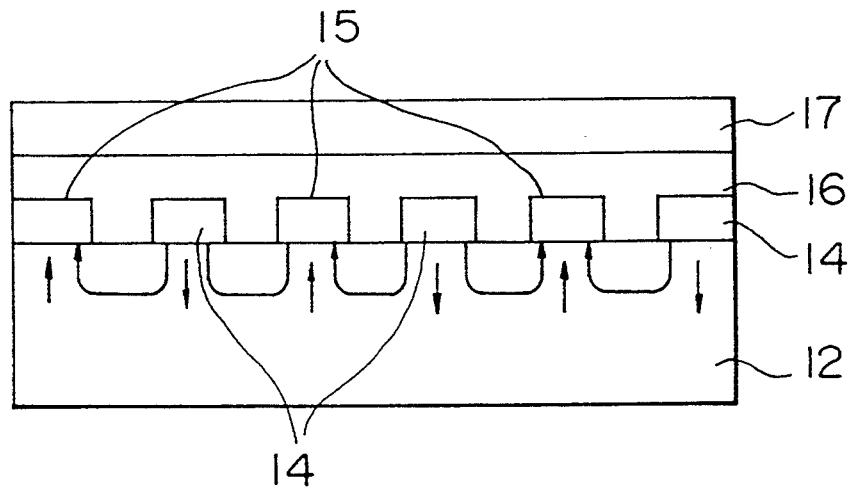
FIG. 11 is a diagram showing a still other embodiment of a transducer.

This assembly is obtained by cutting an array structure. However, an array structure can be produced by crystal growth of a thin piezoelectric layer (e.g., ZnO). Also, with a material whose lateral influence is less, such as a polymeric piezoelectric material (e.g., PVDF), a composite piezoelectric material, and a lead titanate (PbTiO₃), a transducer of a structure shown in FIG. 10 may be constructed without cutting operation. FIG. 11 shows an example in which reverse polarizations are achieved by comb-type electrodes.

Although there has been described so far the invention applied to the catheter combined with the laser, it is not restricted to this. For example, the invention can be applied to a catheter for balloon angioplasty. Further, it may be combined with a conventional ultrasonic catheter for picking up an image of the section perpendicular to the catheter. Also, piezoelectric transducers for measuring blood pressures, piezoelectric transducers for measuring blood flow velocities, or the like may be incorporated. Although an equally spaced array has been described above as the transducer, the invention can be modified into irregular array arrangements of various kinds, such as M-type array and barker-type array.

A third embodiment of the present invention will now be described.

Figure 13:
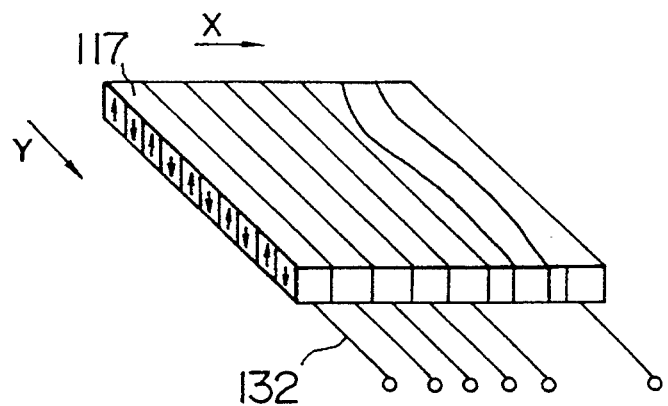
FIG. 13 is a perspective view schematically showing a probe according to the third embodiment.
Figure 14:
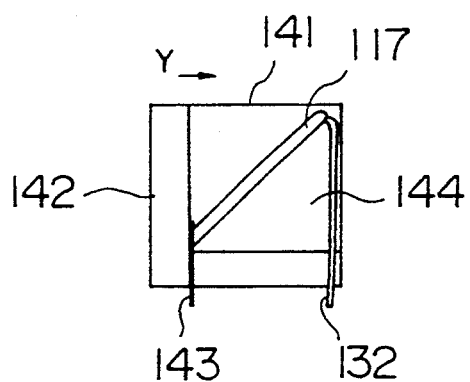
FIG. 14 is a structural diagram of the probe in the third embodiment.
Figure 15:
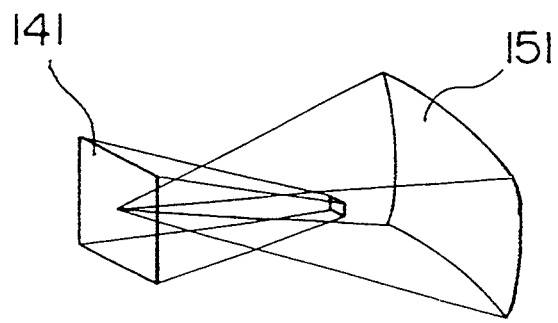
FIG. 15 is a diagram for explaining beam scanning directions in the third embodiment.

FIG. 13 is a perspective view schematically showing a probe according to the third embodiment of the invention; FIG. 14 is a structural diagram of this probe; and FIG. 15 is a diagram for explaining beam scanning directions in the third embodiment.

First, the structure of the probe for use in the third embodiment of ultrasonic apparatus and the beam scanning will be described.

In FIG. 13, reference numeral 117 denotes an elongated transducer; and 132 denotes a signal line. Arrows in elements of the transducer 117 indicate polarization directions. In FIG. 14, reference numeral 141 denotes a probe; 142 denotes an ultrasonic wave absorber; 143 denotes a ground line; and 144 denotes a backing member.

The probe 141 of this embodiment comprises the elongated transducers 117 which are juxtaposed. Consequently, signal electrodes to which the signal lines 132 are connected are cut into similarly elongated portions, and the other ends of the transducers are commonly connected to the ground line 143. The upper surface of the probe 141 is an ultrasonic wave transmitting surface, and the transducers 117 are provided at an angle of 45° with respect to the radiation surface.

The transducers 117 are supported by the backing member 144. The signal lines 132 are guided by flexible cables or the like, and the ground line 143 is guided similarly. The ultrasonic wave absorber 142 serves to absorb unnecessary ultrasonic waves which are radiated in symmetry between the ultrasonic wave radiation direction and a normal direction toward the transducers 117.

In this embodiment, the ultrasonic absorber 142 has a flat plane. However, there can be suggested a method of designing it to have a curved surface in order to prevent ultrasonic waves in unnecessary directions from entering the transducers 117. The installation angle of the transducers 117 is not limited to 45°. A plurality of acoustic matching layers may be provided on the front surface of the transducers 117.

As a method of manufacturing the probe 141, there is also a method of arranging piezoelectric members in such a manner as to make the polarization directions different. If a material having high anisotropy (e.g., lead titanate) is used, polarization inversion can be formed by patterns of electrodes without cutting operation. Also, polarization inversion can be formed by patterns of electrodes in polymeric piezoelectric members. Further, ferroelectric films in the form of arrays which can be constructed by sputtering technique, and composite piezoelectric materials can be employed.

With the above-described structure, a beam can be scanned toward a desired point, as shown in FIG. 15. This diagram shows a configuration of beam scanning, in which reference numeral 151 denotes a scanning surface. In this embodiment, when one transducer 117 is driven by pulse waves whose wave number is plural at a drive signal frequency f, ultrasonic waves are radiated at an angle in the direction Y corresponding to the frequency. For instance, as shown in FIG. 14, the transducers 117 are inclined in the direction Y at an angle of 45° with respect to the radiation surface. In the case where the probe is inserted into a medium having a sound velocity of 1500 m/s and the transducers 117 have a polarization inversion pitch of 0.43 mm, and a drive frequency of 3.5 MH$_Z$ to 2.0 MH$_Z$, the beam is scanned from the surface of the probe for about ±15° in the direction Y. Moreover, by deviating the phases of drive waves between the elements, the beam scanning in the direction X can be performed. Furthermore, by delaying operations between the elements in the direction X for the purpose of phase regulation, the beam can be scanned for a desired angle in the direction X and focused on a desired point.

Next, a transmission and reception processing unit will be described.

Figure 12:
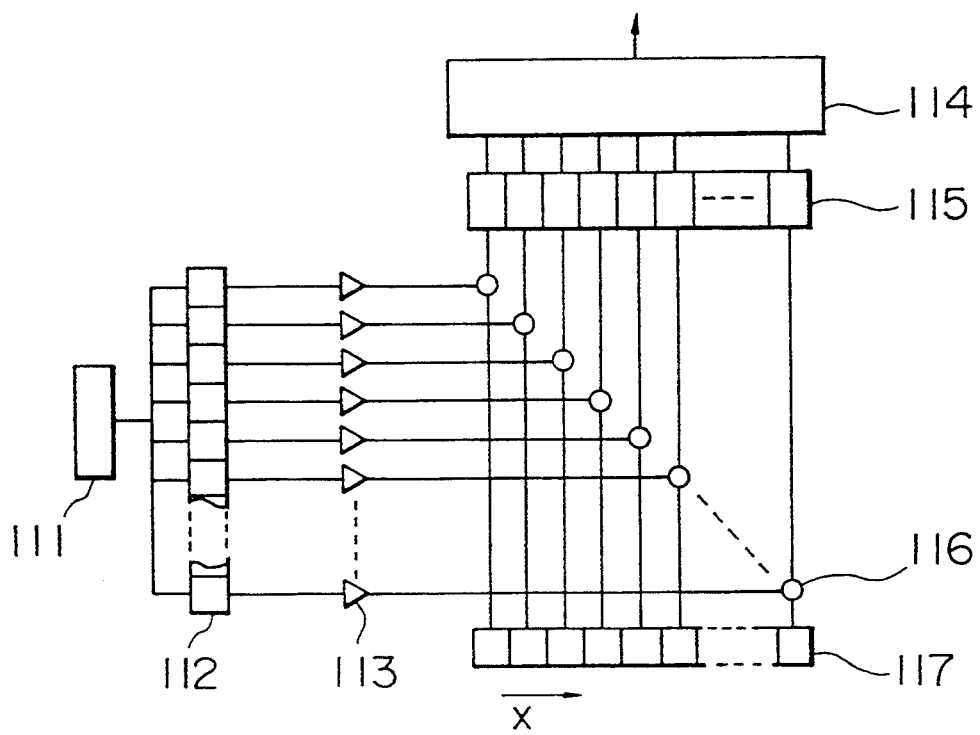
FIG. 12 is a structural diagram showing a transmission and reception processing unit of an ultrasonic apparatus in a third embodiment of the invention.
Figure 16:
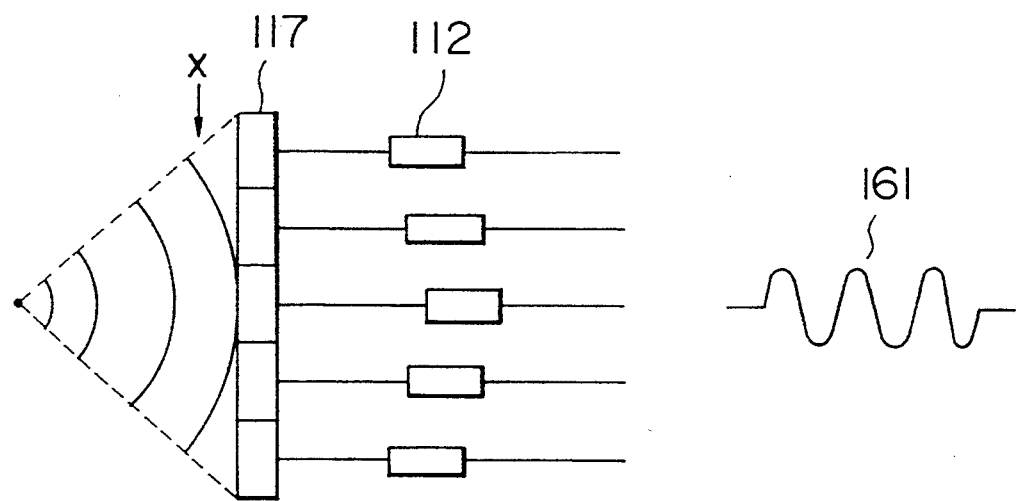
FIG. 16 is a diagram for explaining a transmission pulse in a direction X in the third embodiment.

FIG. 12 is a structural diagram showing the transmission and reception processing unit of the ultrasonic apparatus in the third embodiment of the invention; and FIG. 16 is a diagram for explaining transmission pulses in the direction X in the same embodiment.

Referring to FIG. 12, the transmission and reception processing unit comprises a transmission pulse generator 111, transmission delay circuits 112, drive circuits 113, an adding circuit 114, reception delay circuits 115, transmission and reception separating circuits 116, and the transducers 117.

In this embodiment, the transmission pulse generator 111 outputs pulses whose wave number is plural at a frequency which determines the scanning angle in the direction Y; the transmission delay circuits 112 set the proper phase in the direction X; and the drive circuits 113 function to drive the transducers 117 so as to radiate ultrasonic waves. Then, reflection echoes from an examination subject are received by the same transducers 117, led to the reception delay circuits 115 for phase regulation by way of the transmission and reception separating circuits 116, added by the adding circuit 114, and converted into a raster signal corresponding to one particular scanning direction.

Preamplifiers may be provided before the reception delay circuits 115. A favorable image can be obtained when band characteristics of a reception processing unit including transducers, in a range of the drive signal frequencies in relation to all the raster signals are determined to obtain the same strength in the direction of the subject.

FIG. 16 shows signals of an arrangement in the direction X which are applied to the transducers 117 with this structure. More specifically, a transmission pulse 161, which is delayed by the transmission delay circuits 112, is applied to the transducers 117, so that a beam can be scanned and focused in a desired direction. This transmission pulse 161 is a pulse whose wave number is plural (n/2), and by changing its frequency, scanning in the direction Y is performed.

Other than a method of using the same pulse of the specific frequency, there is a method of focusing in the direction Y by making this pulse a chirp signal. With the pulse compression technique, the S/N and the distance resolution can be improved. This can be realized by providing dispersed delay lines after the addition. In addition to a method in which analog signals are used as they are for the reception processing, there is a method of A/D conversion and digital signal processing. Further, reception digital signals are subjected to digital phase regulation and processed through the frequency analysis.

Another embodiment of a transmission and reception processing unit in the ultrasonic apparatus will now be described. A probe of this embodiment has substantially the same structure as in the third embodiment.

Figure 17:
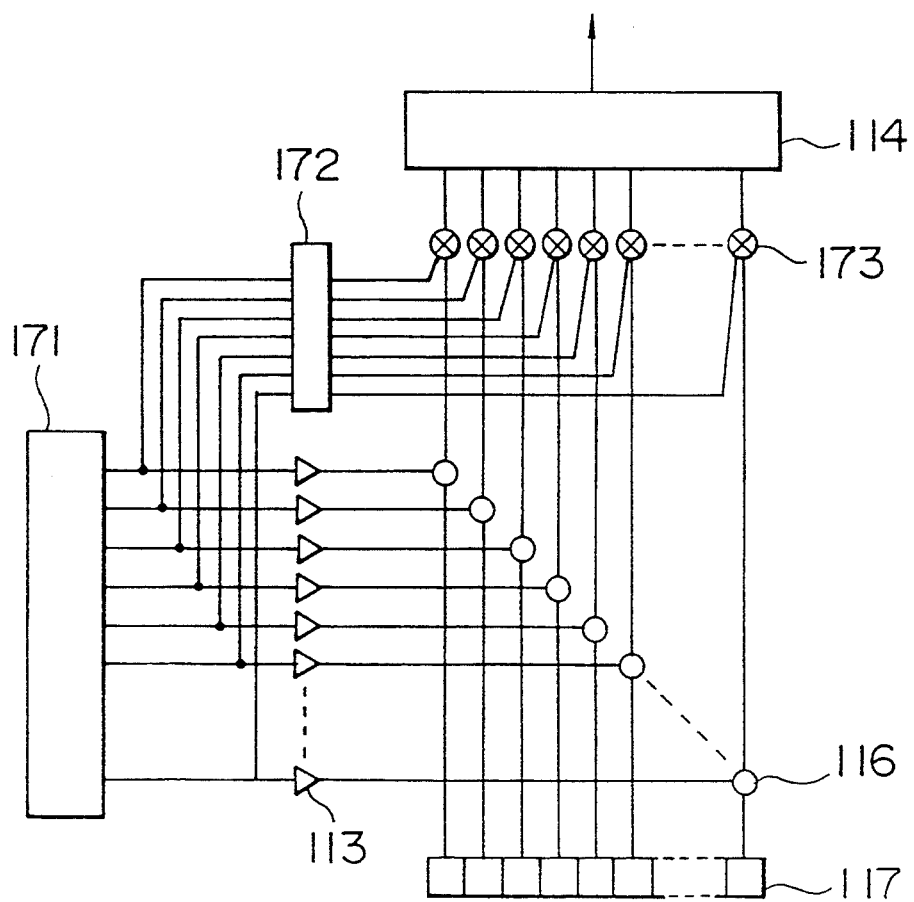
FIG. 17 is a structural diagram showing a transmission and reception processing unit in a fourth embodiment of the invention.
Figure 18:
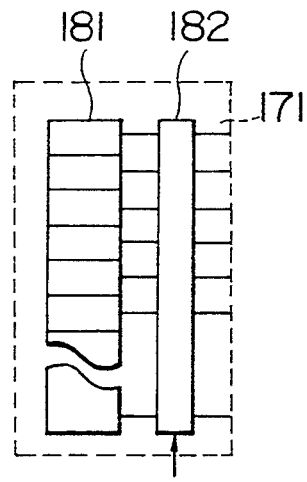
FIG. 18 is a structural diagram showing a transmission pulse generating section in the fourth embodiment.
Figure 19:
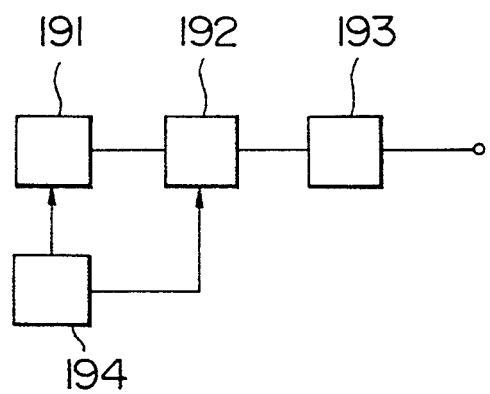
FIG. 19 is a structural diagram showing a transmission pulse generator in the fourth embodiment.
Figure 20:
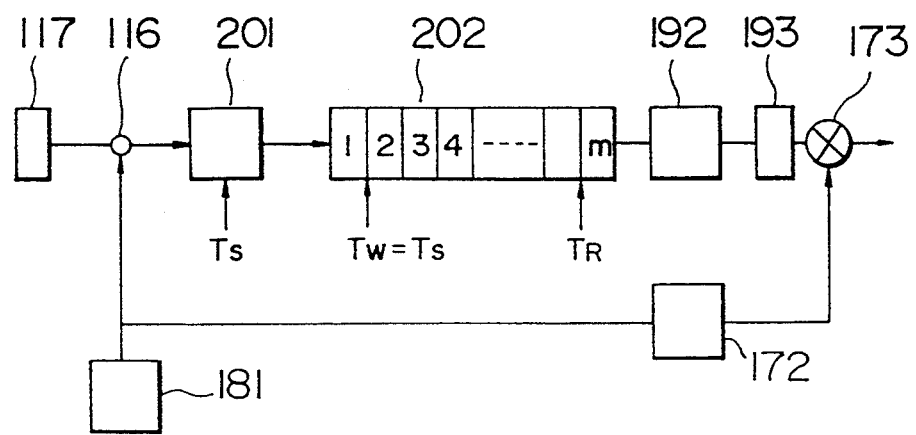
FIG. 20 is a structural diagram of a reception processing unit in the fourth embodiment.
Figure 21:
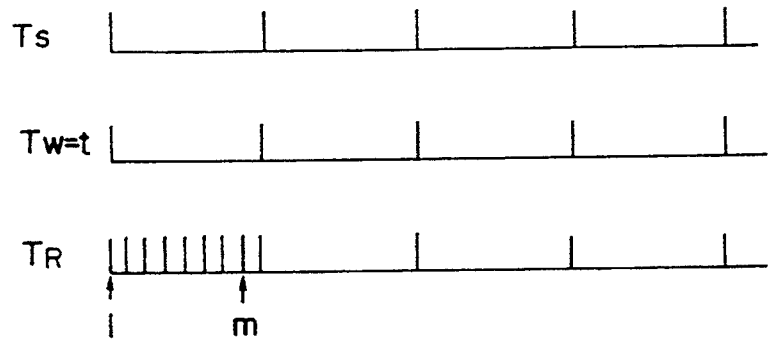
FIG. 21 is a timing chart illustrative of writing and reading of storage elements at the time of reception in the fourth embodiment.

FIG. 17 is a structural diagram of the transmission and reception processing unit in the fourth embodiment of the invention; FIG. 18 is a structural diagram of a transmission pulse generating section in the fourth embodiment; FIG. 19 is a structural diagram of a transmission pulse generator in the fourth embodiment; FIG. 20 is a structural diagram of a reception processing unit in the fourth embodiment; and FIG. 21 is a timing chart illustrative of writing and reading of memory elements at the time of reception in the fourth embodiment.

In FIG. 17, reference numeral 171 denotes the transmission pulse generating section; 172 denotes a reference signal generating section; and 173 denotes a mixer.

In this embodiment, the transmission pulse generating section 171 outputs a transmission pulse, and the transducers 117 are driven by the drive circuits 113 so as to radiate ultrasonic waves. Then, echoes from an examination subject are led to the reception processing unit by way of the transmission and reception separating circuits 116, and mixed with reference signals from the reference signal generating section 172 by means of the mixers 173. These reference signals are obtained by continuously repeating the transmission pulses which have driven the respective transducers. Besides, the reference signals in each channel have a phase. Consequently, the phase regulation is performed along with the frequency change, and a beam is formed on the same point as the transmission.

Referring to FIG. 18, the transmission pulse generating section 171 comprises transmission pulse generators 181 and a multiplexer 182. With this structure, pulses which have been stored in advance are read in the transmission pulse generators 181, and the multiplexer 182 processes them in such a manner that desired transmission pulses are applied to the respective transducers.

Referring now to FIG. 19, each of the transmission pulse generators 181 comprises a storage element 191, a D/A converter 192, a filter 193 and a control section 194.

In this embodiment, in order to generate transmission pulses, various kinds of patterns (including frequencies and phases) of transmission pulses are stored in the storage element 191, and a transmission pattern corresponding to a scanning direction of the beam and a focus point is read in response to a command from the control section 194. Then, an analog transmission pattern is obtained through the D/A converter 192 and the filter 193. Therefore, maximum diameter channels are provided side by side. It is also possible to use the stored element 191 commonly for the transducers and to switch to each channel by the multiplexer 182.

The structure of the reception processing unit of this embodiment is illustrated in detail in FIG. 20.

In FIG. 20, reference numeral 201 denotes an A/D converter; and 202 denotes storage elements.

In this embodiment, for example, when transmission signals for focusing in the direction Y are chirp signals, as shown in FIGS. 20 and 21, signals received by the transducer 117 are led to a reception circuit by way of the transmission and reception separating circuit 116, turned into digital signals in a sampling period $T_S$ by the A/D converter 201, and stored successively in the storage elements 202. In this case, when the transmission pulse width is set at $m \times T_S$, a number m of storage elements are necessary. When reading time is expressed by $T_R$, reading is conducted in $T_R = T_S/m$, and analog conversion is performed through the D/A converter 192 and the filter 193. On the other hand, transmission signals are uniformly compressed into 1/m by the reference signal generator 172 and repeated in the sampling period. These signals are mixed in the mixer 173 where frequency change and phase regulation are performed. It should be noted that $T_S$ is also a data shift period in the storage elements 202.

This flow of data will be explained next. Reception signals are subjected to sampling in $T_S$, converted into digital data, and stored in Address 1 of the storage element 202. At the time of $2T_S$, the data in Address 1 are transferred to Address 2, and new data are stored in Address 1. This operation is repeated successively, and at the time of $m \times T_S$, data are stored in Address 1 to Address m. Then, the data are read from m to 1 in a period of $T_S/m$, and after the data have been shifted, new data at the time of $(m+1)T_S$ are stored in Address 1. At this stage, signals as a result of compressing the transmission signals into 1/m can be obtained, and consequently, reference signals are also compressed into 1/m and mixed. This operation is repeated.

In this embodiment, the storage elements are digital elements, and mixing operation is performed with analog signals. However, the operation may be all conducted with digital signals. Alternatively, it can be all conducted with analog signals. Moreover, an RAM or the like may be used as the storage element so that the operation can be performed only by address designation without shift scanning.

Furthermore, in this embodiment, the transmission pulse generator 181 reads the stored pulses when it generates transmission pulses. However, there may be employed a method of generating transmission pulses having phases in the transmission pulse generator 181.

Next will be described a three-dimensional imaging method in which the ultrasonic apparatus in the above embodiment is used. In this method, after obtaining three-dimensional data of an examination subject, software processing is performed for voxel display, shadow display, wire frame display and so on.

Figure 22:
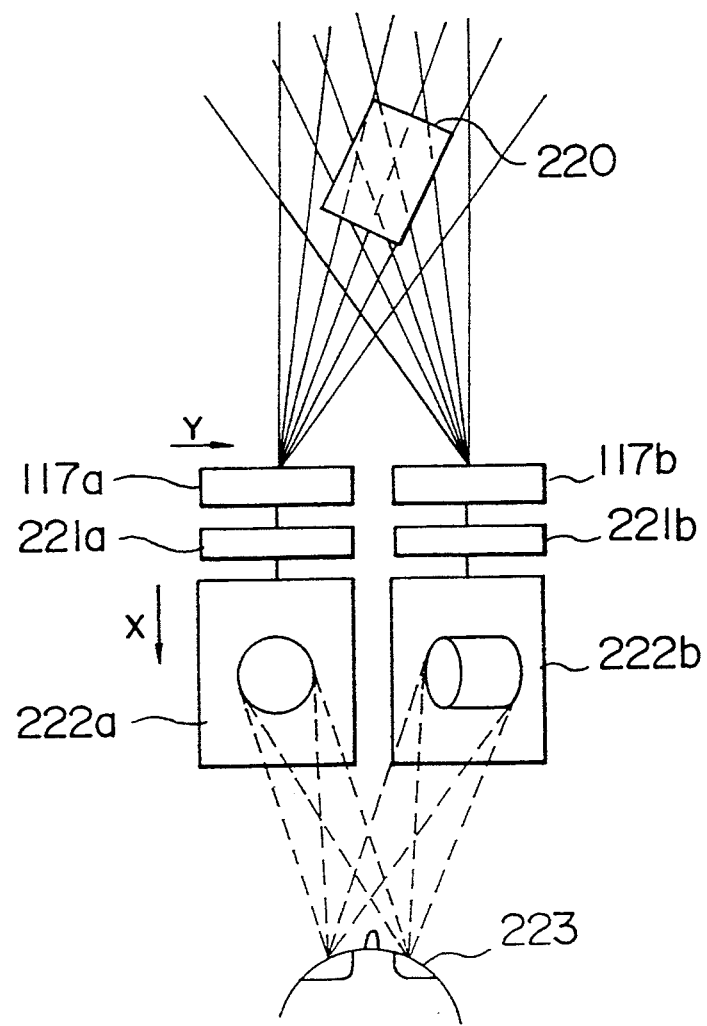
FIG. 22 is a diagram for explaining a three-dimensional imaging method in a fifth embodiment of the invention.
Figure 23A:
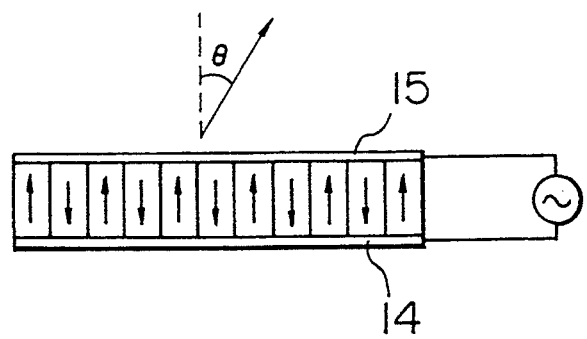
FIGS. 23A, 23B and 23C are diagrams for explaining the principle of a transmitter for a conventional ultrasonic apparatus.
Figure 23B:
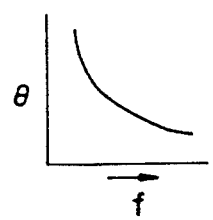
Figure 23C:
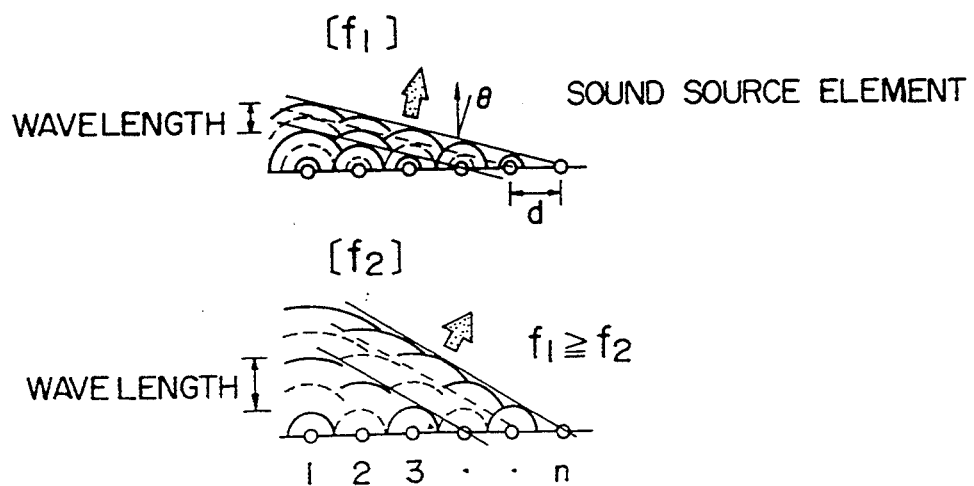

FIG. 22 is a diagram for explaining the three-dimensional imaging method in a fifth embodiment of the invention.

In FIG. 22, reference numerals 117a, 117b denote transducers; 220 denotes an examination subject; 221a, 221b denote reception processing units; 222a, 222b denote display; and 223 denotes an operator. FIG. 22 is a plan view as viewed along the direction Y of scanning a beam of ultrasonic waves by frequency sweepage. The transducers 117a, 117b and the reception processing units 221a, 221b have substantially the same structures as in the third or fourth embodiment.

In the fifth embodiment, the two transducers are arranged in symmetry in such a manner that, by scanning the examination subject 220, images corresponding to the respective probes are shown on the display 222a, 222b while their lateral relationship is maintained as it is. When the operator 223 watches the images with both of his eyes, they appear three-dimensional due to the parallax. The direction Y of the probe is indicated horizontally and the direction X of the probe is indicated vertically on the display 222a, 222b, to thereby obtain views of normal vision. Values of integrals of resters are used as data. Alternatively, ordinary tomogram images are first displayed, and ROI (Region Of Interest) are determined, and then, values of integrals of rasters between the determined values are used as data. The surface of the examination subject 220 may be detected and displayed.

Although the probes shown in FIGS. 13 and 14 are used in this embodiment, the three-dimensional imaging can be realized with commonly used two-dimensional array probes.

Moreover, this embodiment can be also applied to a diametrical transfer system. Although equally spaced polarization-inverted arrays are employed in this embodiment, probes which are controlled by coded programs, such as M-type arrays, barker codes and the like, may be used.

Furthermore, according to this embodiment, frequency sweepage is performed, and therefore, attenuation properties and so forth of the examination subject in frequencies can be analyzed.

According to the present invention, as described heretofore, tomogram images can be obtained by scanning ultrasonic waves electrically with a small number of signal lines, so that the ultrasonic apparatus can be attached to a thin catheter to be inserted into a blood vessel or the like.

According to the invention, without changing the beam scanning method of an array of the conventional electronic scanning type, beams can be scanned in three dimensions with the same number of signal lines. Consequently, the invention takes effects in suppressing an increase in the number of signal lines and an increase in the scale of circuits so as to drive two-dimensional array transducers. Further, a three-dimensional image can be easily obtained by showing views of normal vision from two directions.

What is claimed is:

1. An ultrasonic apparatus for transmitting ultrasonic waves and receiving reflection waves from an examination subject for display comprising at least one transducer which transmits ultrasonic waves in respective directions determined by each of a plurality of frequencies of a transducer drive signal and receives reflection waves from the examination subject, wherein tomogram images obtained by the transducer are displayed.

2. An ultrasonic apparatus according to claim 1, wherein said transducer is provided in a catheter.

3. An ultrasonic apparatus according to claim 2, wherein said transducer transmits ultrasonic waves having a frequency of 10 MHz or more.

4. An ultrasonic apparatus according to claim 3, wherein said transducer is made of an equally spaced array arranged to have alternately reverse directions of polarization.

5. An ultrasonic apparatus according to claim 2, wherein said transducer has plural polarization-inverted, equally spaced, elements to transmit and receive ultrasonic waves in respective directions determined by each of a plurality of frequencies of a transducer drive signal, wherein said elements are driven by pulse waves whose wave number is plural; transmission is repeated in a repetition period which is equal to or longer than the time required for a round trip of an ultrasonic wave to a desired depth for display; the drive signal frequency of said transmission is changed to perform sector scanning with respect to said transducer; and echo signals received at the time of each transmission are displayed, to obtain B-mode tomogram images.

6. An ultrasonic apparatus according to claim 5, wherein a frequency to determine a direction of transmitting the ultrasonic waves is regarded as a center frequency, and frequencies are swept into the vicinity of the center frequency, so that an ultrasonic beam will be electronically focused.

7. An ultrasonic probe for an ultrasonic apparatus according to claim 5, wherein said probe comprises means for acoustic matching with the examination subject, provided on a front surface of said transducers, means for supporting said transducers, means for absorbing ultrasonic waves in directions other than the intended direction, the surface of said transducers being inclined to a front surface of said ultrasonic probe.

8. An ultrasonic apparatus according to claim 2, wherein said at least one transducer is oblique to a longitudinal axis of the catheter to obtain tomogram images which are in front of said catheter.

9. An ultrasonic probe for an ultrasonic apparatus according to claim 1, wherein said transducers are in an elongated shape and are arrayed to enable three-dimensional scanning.

10. An ultrasonic probe for an ultrasonic apparatus according to claim 9, wherein said probe comprises plural transducers each of which is made of an equally spaced array arranged to have alternately reverse directions of polarization.

11. An ultrasonic apparatus according to claim 1, wherein said at least one transducer has an acoustic matching layer formed on a front surface thereof.

12. An ultrasonic apparatus according to claim 1, wherein said at least one transducer is made of one of a lead titanate (pbTiO$_3$), a polymeric piezoelectric material, a piezoelectric thin film, and a composite piezoelectric material.

13. An ultrasonic apparatus for transmitting ultrasonic waves and receiving reflection waves from an examination subject for display, comprising an ultrasonic probe having arrayed transducers in an elongated shape which transmit ultrasonic waves in respective directions determined by each of a plurality of frequencies of a transducer drive signal and receive reflection waves from the examination subject, and means for electronic scanning and focusing in a direction of array of the transducers in the elongated shape, and electronic scanning in a direction perpendicular to said direction of array is conducted by changing said transducer drive signal frequency.

14. An ultrasonic apparatus according to claim 13, wherein an examination subject is imaged in a three-dimensional manner.

15. An ultrasonic apparatus according to claim 13, wherein each of said arrayed transducers is made of an equally spaced array arranged to have alternately reverse directions of polarization.

16. A three-dimensional imaging apparatus comprising ultrasonic probes each of which has arrayed transducers in an elongated shape which transmit ultrasonic waves in respective directions determined by each of a plurality of frequencies of a transducer drive signal and receive reflection waves from an examination subject.

17. A three-dimensional imaging apparatus according to claim 16, wherein each of said arrayed transducers is made of an equally spaced array arranged to have alternately reverse directions of polarization.

18. An ultrasonic diagnosis method which uses two ultrasonic probes having an array of transducers in an elongated shape that are inclined to a front surface of said ultrasonic probes comprising the steps of transmitting ultrasonic waves from said transducers in respective directions determined by each of a plurality of frequencies of a transducer drive signal and receiving reflection waves from an examination subject on said transducers, wherein images of the examination subject are picked up from two directions by said probes, so that three-dimensional views of normal vision obtained by said probes are shown on display corresponding to said two directions.

19. An ultrasonic diagnosis method according to claim 18, wherein each of said arrayed transducers is made of an equally spaced array arranged to have alternately reverse directions of polarization.

20. A three-dimensional imaging apparatus comprising two ultrasonic probes having an array of transducers in an elongated shape, which transmit ultrasonic waves in respective directions determined by each of a plurality of frequencies of a transducer drive signal and receive reflection waves from an examination subject, wherein images of the examination subject are picked up from two directions by said probes, so that views of normal vision obtained by said probes are shown on display corresponding to said two directions.

21. A three-dimensional imaging apparatus according to claim 20, wherein each of said arrayed transducers is made of an equally spaced array arranged to have alternately reverse directions of polarization.

22. An ultrasonic diagnosis method comprising the steps of:
    transmitting from a transducer, ultrasonic waves in respective directions determined by each of a plurality of frequencies of a transducer drive signal;
    receiving reflection waves, from an examination subject, on said transducer; and
    displaying tomogram images obtained by said transducer.

* * * * *